(No Model.)
F. S. INGOLDSBY.
FRONT COUPLING FOR WAGONS.
No. 551,321. Patented Dec. 10, 1895.
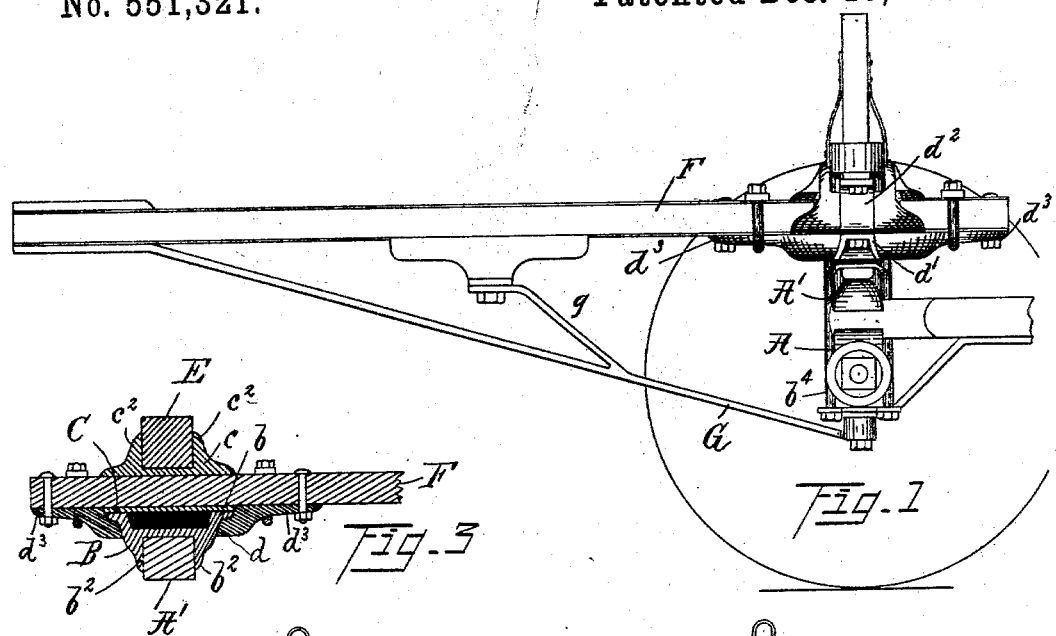
Fig. 1.
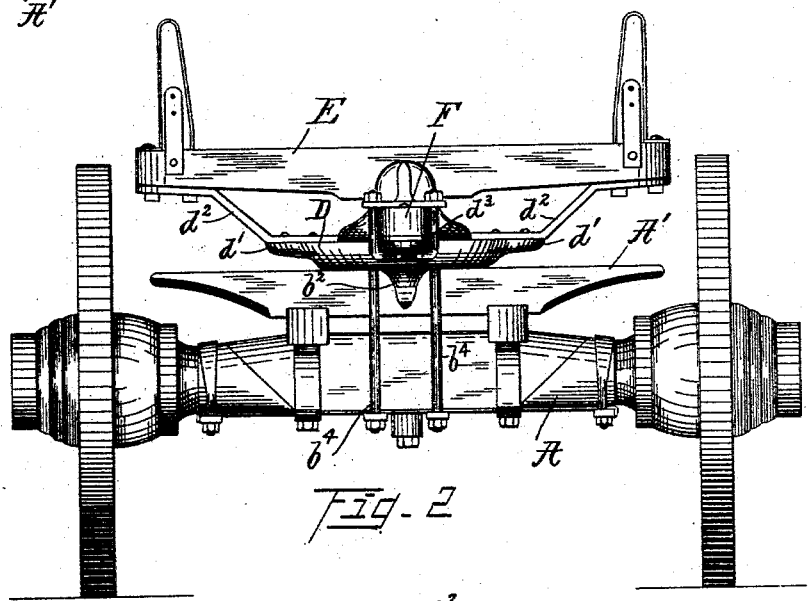
Fig. 2.
Fig. 3.
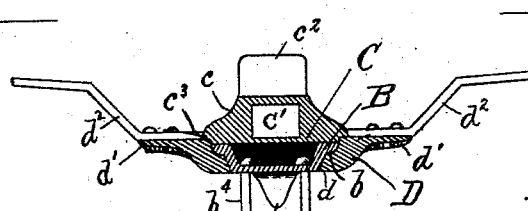
Fig. 4.
Witnesses
L. Griswold
Helen M. Flood
Inventor
Frank S. Ingoldsby
By his attorney
E. L. Thurston

UNITED STATES PATENT OFFICE.

FRANK S. INGOLDSBY, OF DENVER, COLORADO.

FRONT COUPLING FOR WAGONS.

SPECIFICATION forming part of Letters Patent No. 551,321, dated December 10, 1895.

Application filed April 1, 1895. Serial No. 544,069. (No model.)

*To all whom it may concern:*

Be it known that I, FRANK S. INGOLDSBY, a citizen of the United States, residing at Denver, in the county of Arapahoe and State of Colorado, have invented certain new and useful Improvements in Front Couplings for Wagons; and I do hereby declare the following to be a full, clear, and exact description of the invention, such as will enable others skilled in the art to which it appertains to make and use the same.

My invention relates to certain improvements in the front coupling of wagons, including the fifth-wheel.

The invention is particularly designed for use upon wagons which are subjected to uncommon and severe strains, due either to large loads or to the unevenness of the roads upon which they may be used.

The objects of the invention are to provide a front coupling, including the fifth-wheel, in which no king-bolt is used, which will permit the front axle to have the necessary movement, but which will hold the said axle and bolster in parallel planes, and which while simple and cheap in construction is composed of parts so formed and arranged as to distribute and take up the strains to which it will be subjected and thereby prevent breakage.

The invention consists in the construction and combination of parts hereinafter described, and pointed out definitely in the claims.

In the drawings, Figure 1 is a side elevation of my improved front coupling. Fig. 2 is a front elevation thereof. Fig. 3 is a central longitudinal vertical section through the fifth-wheel device, and Fig. 4 is a central transverse vertical section thereof.

Referring to the parts by letter, A represents the front axle, and A' a sand-bolster which is secured upon said axle. The sand-bolster is not, however, a necessary part of the construction and may be dispensed with, if desired. If it is dispensed with, the movable part B of the fifth-wheel device may be connected directly with the axle without any change in its form.

E represents the bolster upon which the wagon-box rests, and F represents the reach.

B represents a plate which forms the movable part of the fifth-wheel device, which plate is secured upon the front axle or sand-bolster A', as the case may be. As shown in the drawings, it is secured upon the sand-bolster. The plate B is dish-shaped, and is provided upon its periphery with a horizontal circular flange $b$. The plate is secured to the sand-bolster and front axle by means of the bolts $b^4$, which pass through it and extend down close to the front and rear sides of the sand-bolster and front axle, to which they are clipped or otherwise secured. The heads of the bolts $b^4$ lie in the central depression within the annular flange $b$, the tops of said heads being below the plane in which the upper surface of said flange lies. On the under side of the plate B are two projections $b^2$ $b^2$, between which the sand-bolster fits snugly. These projections serve to strengthen the connection between the plate B and the sand-bolster and to relieve the bolts $b^4$ of some of the strain to which they would otherwise be subjected.

C represents a circular rub-plate, the diameter of which is equal to the diameter of the flange $b$, and this rub-plate rests upon said flange $b$. On the upper side of this plate is a projection $c$, in which is formed a longitudinal horizontal hole $c'$, through which the reach passes and in which it fits snugly. On top of this projection are two lugs $c^2$ $c^2$, between which the bolster E fits closely, said bolster resting upon said projections above the reach.

D represents a collar which embraces the flange $b$ and the rub-plate C, thereby preventing any side movement of the one upon the other. It is provided with a flange $d$, which passes beneath the flange $b$, whereby when said collar is secured, as hereinafter described, to the bolster E any movement of said plate B with respect to the plate C, except the horizontal movement about a vertical axis, is effectually prevented. Surrounding the circular part of the rub-plate C is an annular horizontal flange $c^3$, which lies against or very close to the top of the collar D and thereby prevents the entrance of dust into the space bounded by said collar. On the collar D are two lateral arms $d'$ $d'$, which lie beneath and parallel to the bolster E. $d^2$ $d^2$ represent braces which are secured at their lower ends to said arms $d'$ by bolts or rivets, the ends of said braces abutting plate C; or, to describe the construction more exactly, they abut against the flange $c^3$ on the rub-plate. The outer ends of said braces are bolted to the bolster E near its ends. These braces act both as tension and compression braces to resist any tension of the plate B to move in any direction except that in which it is intended to move—viz., horizontally about a vertical axis—for no other movement of said plate can take place without producing some strain upon the collar D tending to move its sides up or down, and such movement of the collar D in one direction would draw upon one of the braces $d^2$ and would tend to compress the other of said braces; and this last-named compression strain would not all be borne by the bolts which connect it with the collar, but the thrust would be partly borne by the rub-plate C, against which the ends of said brace abut.

$d^3\ d^3$ represent two horizontal arms extending forward and backward from the collar D, which arms bear against and are clipped to the under side of the reach. Any strains tending to move the front or rear parts of the collar D up or down are resisted by the reach through said arms $d^3$, and such movement is impossible unless the reach is crushed or broken.

G represents a diagonal brace which is pivotally bolted to the under side of the front axle midway between its ends, and it extends therefrom rearward, its rear end being bolted to the reach. A short arm $g$ may be welded to the brace G, and its upper end may be bolted to the reach at a point between the front and rear axles and the point where the rear end of said brace is connected with the reach.

From the foregoing description it will be seen that while the front axle is secured to the bolster without the use of a king-bolt in such manner as to permit said front axle to turn upon a vertical axis the connecting mechanism or fifth-wheel device is extraordinarily strong, its four arms $d'\ d'\ d^3\ d^3$ and the braces $d^2\ d^2$ not only strengthening the fifth-wheel, but also the bolster and reach, to which they are attached, and at the same time it is extremely simple and inexpensive.

Having described my invention, I claim—

1. In a wagon, the combination of a dish-shaped plate adapted to be secured to the front axle or sand bolster having on its edge a horizontal circular flange, a circular rub plate adapted to be secured to the bolster, a cylindrical collar embracing both the rub plate and the flange on the under plate, and having a flange which extends beneath said flange on the under plate, and diagonal lateral braces for connecting said collar with the bolster, substantially as and for the purpose specified.

2. In a wagon, the combination of a dish-shaped plate B adapted to be secured to the sand bolster or front axle, having on its under side two projections $b^2\ b^2$ adapted to embrace said sand bolster or front axle, and having also a horizontal circular flange $b$ on its edge, with a cylindrical rub plate C having on its upper side a projection $c$ in which is formed a hole $c'$ to receive the reach, and having above said hole the lugs $c^2\ c^2$ adapted to embrace the bolster, and a cylindrical collar D which embraces said rub plate and flange, having itself a flange $d$ which extends beneath the flange $b$ on the plate B, horizontal arms $d^3\ d^3$ formed on and projecting forward and rearward from said collar and lying against the under side of the reach, lateral arms $d'\ d'$ formed on said collar, and diagonal braces $d^2\ d^2$ secured to the last named arms, and adapted to be connected at their outer ends to the bolster, substantially as and for the purpose specified.

3. In a wagon, the combination of the dish-shaped plate B having on its under side two projections $b^2\ b^2$ adapted to lie close against opposite sides of the front axle or sand bolster to which said plate is bolted, and having on its edge a horizontal circular flange $b$, and a cylindrical rub plate C resting upon said flange, having on its upper side a projection $c$ in which is formed a hole $c'$ through which the reach passes, and having above said hole two lugs $c^2\ c^2$ adapted to lie close against opposite sides of the bolster, and having an annular horizontal flange $c^3$ surrounding the cylindrical part of said rub plate, with a cylindrical collar D embracing the rub plate and flange $b$, and having a flange $d$ which lies beneath said flange $b$, and having also two horizontal arms $d^3\ d^3$ which extend forward and backward and are adapted to lie against the reach, and having also two lateral arms $d'\ d'$, two diagonal braces $d^2\ d^2$ bolted to said lateral arms with their ends abutting the plate C, and adapted to be secured at their outer ends to the bolster, substantially as and for the purpose specified.

4. In a wagon, the combination of a dish-shaped plate B adapted to be bolted to the sand bolster or front axle, having on its edge a horizontal circular flange $b$, a cylindrical rub plate adapted to rest upon the flange $b$, and having means for connecting the same with the bolster, with a collar D embracing said rub plate C and flange $b$, and having a flange $d$ which lies beneath said flange $b$, and having also lateral arms $d'\ d'$, and two diagonal braces $d^2\ d^2$ bolted to the arms $d'\ d'$ with their ends abutting the plate C, and adapted to be bolted at their outer ends to the bolster, substantially as and for the purpose specified.

5. In a wagon, the combination of the bolster, reach and front axle, with a dish-shaped plate secured to the front axle having on its edge a circular flange, a cylindrical rub plate resting on said flange, having on its upper side a projection in which is formed a hole through which the reach passes, and having two lugs which lie close against opposite sides of the bolster, a circular collar embracing said rub plate and flange $b$, and having a flange $d$ which extends beneath the flange $b$, and having also two lateral arms, two diagonal braces bolted at their inner ends to said arms and at their outer ends to the bolster, and a brace bolted at its front end to the under side of the front axle, and at its rear end to the reach, substantially as and for the purpose specified.

In testimony whereof I affix my signature in presence of two witnesses.

FRANK S. INGOLDSBY.

Witnesses:
E. L. THURSTON,
L. F. GRISWOLD.